(No Model.)　　　　　　　　　　　　　　　　　　　2 Sheets—Sheet 1.
C. W. HAYS.
LOADING DEVICE.

No. 500,328.　　　　　　　　　　　Patented June 27, 1893.

Witnesses　　　　　　　　　　　　　　　　　　　Inventor
J. Ulke, Jr.　　　　　　　　　　　　　　　　　Chas. W. Hays,
　　　　　　　　　　　By his Attorneys,
　　　　　　　　　　　　　C. A. Snow & Co.

(No Model.) 2 Sheets—Sheet 2.
C. W. HAYS.
LOADING DEVICE.
No. 500,328. Patented June 27, 1893.
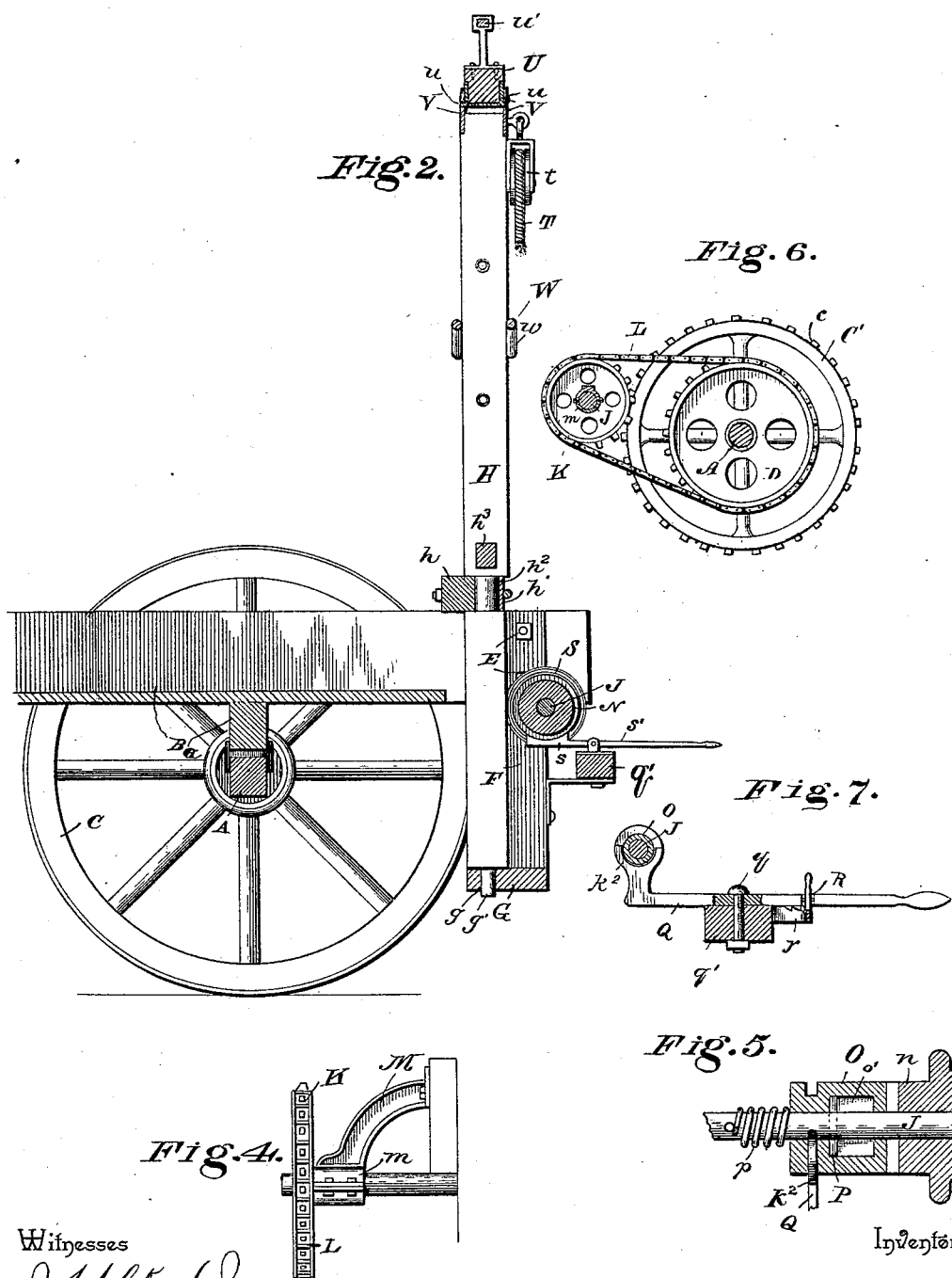

UNITED STATES PATENT OFFICE.

CHARLES W. HAYS, OF STRATFORD, ILLINOIS.

LOADING DEVICE.

SPECIFICATION forming part of Letters Patent No. 500,328, dated June 27, 1893.

Application filed December 19, 1892. Serial No. 455,635. (No model.)

*To all whom it may concern:*

Be it known that I, CHARLES W. HAYS, a citizen of the United States, residing at Stratford, in the county of Ogle and State of Illinois, have invented a new and useful Fodder Loader and Unloader, of which the following is a specification.

This invention relates to fodder loaders and unloaders; and it has for its object to provide an improved loading and unloading apparatus adapted to be connected with a hay wagon or rack so as to provide novel and efficient means for handling corn stover or fodder particularly, easily and readily, so that the shock can be readily hoisted onto the rack, and unloaded at the stack without the exhausting work usually attendant upon this operation.

To this end the invention primarily contemplates certain improvements in loading and unloading devices for hay racks.

With these and many other objects in view which will readily appear as the nature of the invention is better understood, the same consists in the novel construction, combination and arrangement of parts, hereinafter more fully described, illustrated and claimed.

Figure 1:
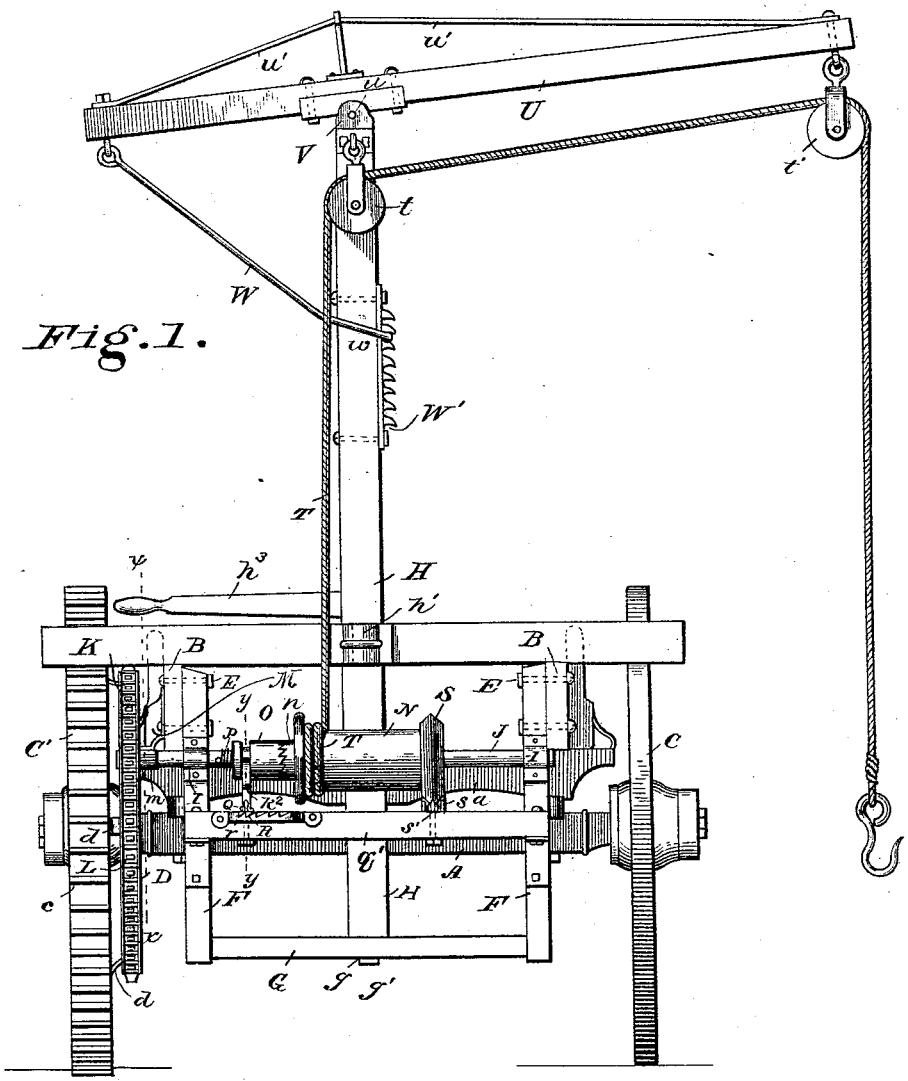
Figure 3:
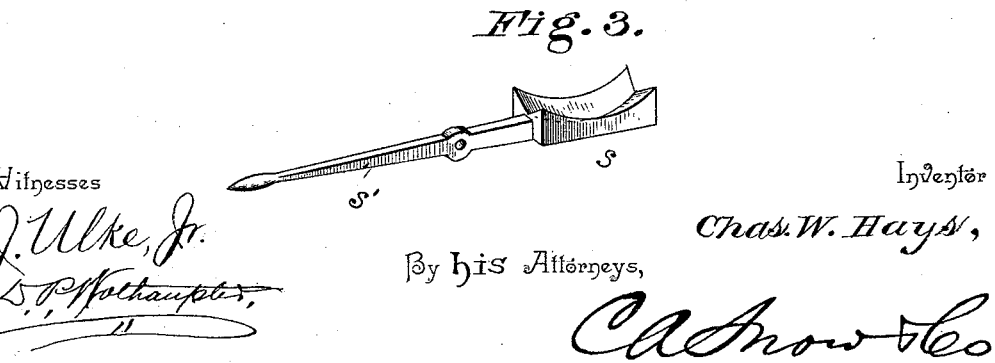

In the accompanying drawings:—Figure 1 is an end view of a hay rack having a loading and unloading apparatus attached thereto, in occordance with the present invention. Fig. 2 is a central vertical sectional view of the apparatus and the rear end of the hay rack to which the same is attached. Fig. 3 is a detail in perspective of the friction brake lever. Fig. 4 is a detail view of the shaft brace. Fig. 5 is a detail sectional view of the sliding clutch sleeve on the shaft. Fig. 6 is a detail sectional view on the line $x$—$x$ of Fig. 1. Fig. 7 is a similar view on the line $y$—$y$ of Fig. 1.

Referring to the accompanying drawings:—
A represents the rear axle of a hay wagon or rack upon which is supported the body bolster $a$, carrying the side frame pieces B of the rack or wagon body, which sides project in rear of the bolster and its supporting axle, as is usual in all racks and wagons. The axle A, carries at each end thereof the wheels C and C', respectively, the wheel C', forming the drive wheel of the apparatus, and having a wide tread provided with a series of calk flanges $c$, which prevents the wheel from slipping and secures the turning thereof. Secured to the hub of the wheel C', on the inside of the same, is the main drive sprocket wheel D, which sprocket is provided with a series of laterally extending securing arms $d$, which are bolted to the spokes of the wheel C', to firmly attach the sprocket thereto.

Secured at their upper ends, by means of the bolts E, to the rear projecting ends of the side frame pieces B, are the opposite depending frame arms F, of the rear attachment frame, said frame arms being connected at their lower ends by the lower supporting cross bar G, having a central bearing perforation $g$, which receives the lower bearing end $g'$, of the revoluble derrick standard H. The revoluble derrick standard H, is held in its vertical or upright position by means of the bearing cross bar $h$, secured to the top of the rear projecting ends of the rack or body sides B, and provided with a removable central bearing box $h'$, clamped to one side of the cross bar and fitting the annular groove $h^2$, formed in the derrick H, so as to provide means for the steady support and bracing of the same in its movement. The derrick can be turned in any direction by means of the turning lever, $h^3$, attached thereto at one end, adjacent to the bar $h$.

Arranged upon the depending frame bars F, above their centers are the opposite bearings I, in which is journaled the transverse drum shaft J, carrying at one end thereof the small sprocket wheel K, over which passes the drive or sprocket chain L, which is driven from the large sprocket wheel D, carried by the calked wheel C'. The strain is taken off of the sprocket-wheel end of the shaft J, by means of the short shaft brace M, secured to one side of one of the sides B, and having at its outer end the box $m$, fitting one side of the shaft J, near its sprocket wheel.

Loosely mounted upon the shaft J, at its center is the winding drum N, having at one end thereof a clutch face $n$, which is designed to be normally engaged by the spring actuated sliding clutch sleeve O, having a corresponding clutch face, an annular groove $o$, and a slot $o'$, in the body thereof. The slot $o'$, in the body of the sleeve O, works over the shaft pin P, passed transversely through the shaft and providing means for holding the sleeve to the shaft in its sliding movement without a turning movement, said clutch sleeve of course turning with the shaft. The clutch sleeve is normally held into engagement with the clutch face of the drum by means of the spring $p$, arranged on the shaft at one end of the sleeve. The said clutch sleeve is thrown in and out of gear or engagement with the drum clutch face by means of the clutch lever Q. The lever Q, is pivoted at $q$, on top of the offstanding cross bar $q'$, which bar is supported at one side of the attachment frame and secured at its ends to the frame bars F. The lever Q, is provided with the usual handle at one end, and with a bifurcated claw $k^2$, at the other end, which fits the groove in the clutch sleeve and thus provides means for throwing the same in and out of engagement, by moving the lever. The lever also carries a spring actuated catch dog R, adapted to engage the teeth of the toothed segment $r$, secured to one side of the offstanding bar $q'$, near one end thereof. The drum N, carries at one end opposite to its clutch face, the oppositely beveled brake flange or wheel S, which is designed to be engaged by the registering angularly recessed brake block $s$, carried upon one end of the brake lever $s'$, pivotally mounted on top of the offstanding bar $q'$, under the wheel or flange S, so that by bearing down upon one end of the lever $s'$, the angularly recessed brake block can be held tightly in engagement with the registering edge of the friction wheel or flange and thereby provide means for retarding the motion of the winding drum N, when desired. The winding drum N, has connected thereto and winds thereon the hoisting rope T, which rope passes therefrom up to the guide pulley $t$, secured to the derrick standard H, near its upper end and from thence over the pulley $t'$, secured to one end of the tilting adjustable derrick arm U. The tilting adjustable derrick arm U, carries near its center a removable pivot plate having the opposite pivot or fulcrum lugs $u$, projecting from opposite sides of the same and mounted in the bearings V, secured to the extreme upper end of the revoluble derrick standard, so that the said derrick arm can be tilted to any position. The said tilting derrick arm is braced by a suitable truss rod $u'$, and carries, at what may be termed its inner or short end the adjustment slip brace W. The brace W, is loosely connected at one end to said derrick arm and is provided at its other end with a loop or eye $w$ adapted to slip over the derrick standard and engage any one of the series of teeth of the toothed adjustment or rack bar W', secured to one side of said standard. By slipping the loop end of the slip brace up and down the derrick arm can be tilted to any adjusted position, and held firmly in such position, as the character of the work demands.

In operation when it is desired to load the shock of corn stover or fodder onto the wagon or rack, the hoisting rope T, is unwound from the drum N, by throwing the clutch sleeve O, out of engagement therewith. The hook end of the rope is then fastened to the shock which has of course been previously bound, and the wagon or rack started. By the time the wagon or rack has been carried to the next shock, the drum N, will have wound up the hoisting rope sufficiently to hoist the shock up to a position so that by swinging the derrick lever $h^3$, the shock can be deposited onto the rack, after releasing the clutch sleeve from the drum N, once more, the shock being lowered into the rack gradually without sudden fall by means of the brake mechanism herein described. The load of the wagon can be unloaded at the stack by disconnecting the hoisting rope P, from the drum and allowing it to pass around and under the same so that it, the drum, will act as a guide pulley, in order that a draft animal can be connected to one end of the rope to hoist the shock out of the wagon and allow the same to be swung over to the stack.

Changes in the form, proportion and the minor details of construction may be resorted to without departing from the principle or sacrificing any of the advantages of this invention.

Having thus described my invention, what I claim, and desire to secure by Letters Patent, is—

1. In a loading and unloading attachment for wagons, the combination with a wheel-supported rack or wagon; of an attachment frame secured to the rear end of the rack or wagon body, clutch winding devices mounted on said frame and driven from one of the wheels of the rack or wagon, a derrick standard mounted to revolve in said attachment frame and removably held in position, a bearing plate attached to the top extremity of said derrick standard, a tilting adjustable derrick arm having a top truss, a removable pivot plate clamped to the lower side of the derrick arm at a point intermediate of its ends and having opposite pivot or fulcrum lugs journaled in the bearing plate on top of the derrick standard, an adjusting brace pivoted at one end to the extremity of the short end of the derrick arm and having an adjustable connection with the derrick standard, rope pulleys attached to the upper end of the derrick standard and the extremity of the long end of the derrick arm respectively and a hoisting rope passing over said rope pulleys and attached at one end to the clutch winding devices, substantially as set forth.

2. The combination with suitable hoisting devices; of a revoluble derrick standard, a turning lever attached to said standard, bearings at the upper end of the standard, a rack bar secured to one side of the standard, a trussed tilting bearing arm having centrally disposed pivot or fulcrum lugs mounted in said bearings on the standard arm, an adjustment slip brace connected to one end of the derrick arm and having a slip loop or eye embracing the standard and adapted to engage the teeth of the rack bar, pulleys on the standard and the arm, and the hoisting rope strung over said pulleys, substantially as set forth.

3. The combination with a wheel supported rack or wagon, of an attachment frame secured to the rear end of the body of said rack or wagon and having a lower supporting cross bar provided with a central bearing perforation, a bearing cross bar arranged on the top of said body at its rear end, a revoluble derrick standard having a lower bearing end working in the bearing perforation of the lower cross bar, and an annular groove at an intermediate point, a bearing box removably clamped to one side of the bearing cross bar on top of the body and fitting said annular groove in the derrick standard, and suitable hoisting devices, substantially as set forth.

In testimony that I claim the foregoing as my own I have hereto affixed my signature in the presence of two witnesses.

CHARLES W. HAYS.

Witnesses:
  CALLO FAHRNEY,
  F. A. GEETING.